Sept. 4, 1928.　　　　　　　　　　　　　　　　　　1,683,154
J. A. BISHOP
VALVE
Filed Feb. 15, 1926

Inventor:
J. A. Bishop.
By Fredk. J. Harrer
Attorney.

Patented Sept. 4, 1928.

1,683,154

UNITED STATES PATENT OFFICE.

JAMES A. BISHOP, OF MASCOUTAH, ILLINOIS; LULU H. BISHOP ADMINISTRATRIX OF SAID JAMES A. BISHOP, DECEASED.

VALVE.

Application filed February 15, 1926. Serial No. 88,258.

My invention relates to valves, and more particularly to high pressure valves having no packing, or in other words, a packless valve, and, it is a distinct and practical improvement to overcome certain practical objections to, and defects in, high pressure valves and particularly of the type shown in my U. S. Letters Patent Number 875,096, and my co-pending application, Serial Number 7,501, over which my present valve structure is an improvement.

The object of my present invention is to provide an all metal high pressure valve obviating all independent decomposable valve packings.

A further object of the invention is to provide a packless valve adapted for use with ammonia, steam, or water with or without alkali properties, water impregnated with sulphur, or with other fluids, both under high or low pressure.

A further object of the invention is to provide a valve which will positively prevent leakage under either high or low pressure.

A still further object of the invention is the provision of a spline and groove connection between two of the valve members to permit of a very fine adjustment of the upper valve stem shoulder with co-acting seat so as to prevent leakage with low pressure steam and water, such as radiator valves and the like, where the assistance of high pressure is lacking to assist in perfecting a tight joint between the valve stem shoulder and its seat.

A still further object of the invention is to provide resilient means disposed within the valve handle itself for exerting upward pressure upon the upper valve stem member of a packless valve to positively prevent leakage from around the valve stem under low pressure as well as high pressure.

A still further object of the invention is the provision of a packless valve which possesses advantages in points of simplicity, efficiency, and, at the same time proves itself comparatively inexpensive in manufacture and especially in maintainance.

With the above and other objects in view, the invention consists in the novel features of construction, arrangement and combination of parts hereinafter more fully described and finally pointed out in the claim hereto appended.

Referring to the accompanying drawings forming a part of this specification, wherein like characters of reference denote similar parts throughout the several views.

In carrying out the aim of my present invention, I have shown a suitable valve casing designated 1 of the globe valve type having the externally screw threaded neck 2.

Figure 1:
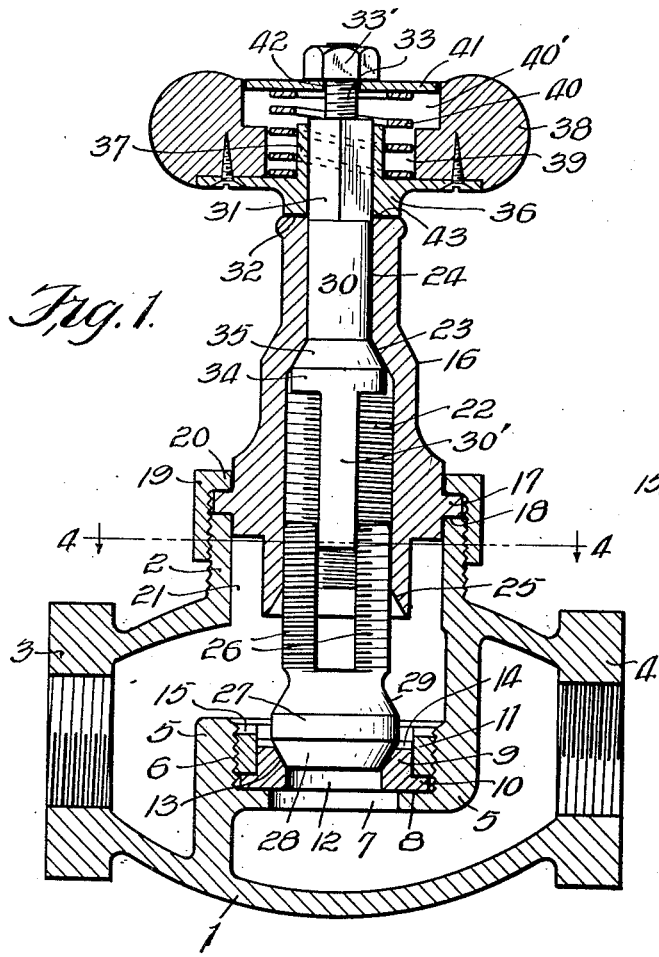
Fig. 1, is a vertical sectional elevation of a packless valve embodying the features of my invention.
Figure 3:
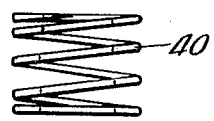
Fig. 3, is a side elevation of the coiled spring.
Figure 4:
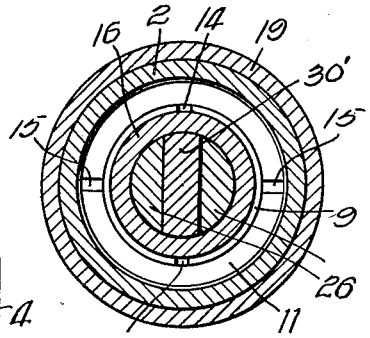
Fig. 4, is a sectional view taken on line 4—4 of Fig. 1.
Figure 2:
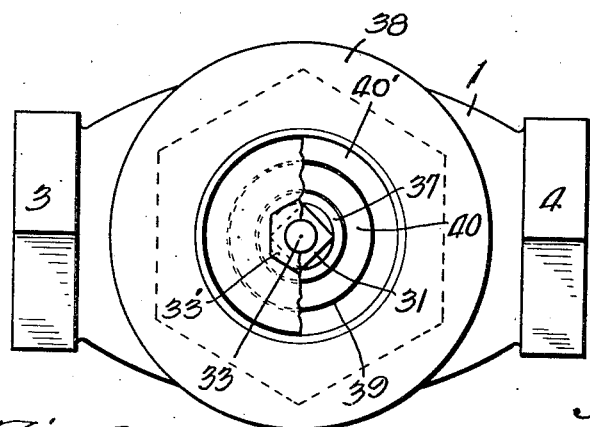
Fig. 2, is a top plan view of the valve with a portion of the handle broken away.

The casing 1 may be of any suitable form, but is illustrated as provided at its ends with the internally screw threaded hexagonal flanges 3 and 4 which provide outlet and inlet openings. A suitable internal partition 5 integral with the casing is provided with a vertically disposed internally screw threaded opening 6 extending partially therethrough, which opening terminates at its lower end in a non-screw threaded opening 7 of a less diameter than opening 6, thus providing a flat flange seat 8, encircling the opening 7. A removable seating disc 9 having a peripheral flange 10 at its lower edge is seated upon the flange seat 8 and held from displacement by means of an externally screw threaded lock ring 11 having engagement with the internally screw threaded opening 6. The lock ring frictionally receives the upper end of the seating disc 9 and the lower face of the lock ring 11 engages the flange 10 of the seating disc, as shown in Fig. 1. The seating disc 9 is provided with an opening 12 at its lower end which registers with the opening 7. The seating disc 9 is further provided with a conical seating face 13 above the opening 12. The upper face of the seating disc is provided with a plurality of facial grooves 14 for receiving a tool for grinding the lower face of the seating disc into perfect contact with flat flange seat 8. The upper face of the lock ring 11 is provided with a plurality of facial grooves 15 for receiving a tool for locking the ring in place and for removing the ring when desired. It will be understood that the seating disc is non screw threaded and is held in position by the locking ring 11 which permits the seating disc to be separated or removed from the lock ring for grinding both contacting surfaces of the seating disc.

The seating disc disclosed in my co-pending application Serial Number 7,501, is not associated with a lock ring, but is itself externally screw threaded.

A suitable closing sleeve cap, or hood 16 is provided with a peripheral flange 17 to provide an angular seating shoulder 18 for contact with the inner and upper faces of the tubular casing neck 2, thereby establishing a leak proof joint at this point. The closing cap, or hood member 16 is clamped in its home position by means of a hexagonal internally screw threaded lock ring 19 having engagement with the externally screw threaded neck 2 and provided with an inwardly directed flange 20 for contact with the upper face of the cap flange 17, as clearly shown in Fig. 1. The cap 16 has its lower end contracted, or reduced in diameter to provide an annular space 21 within the casing neck 2.

The sleeve cap, or hood 16 is provided with an internally screw threaded bore or socket 22 extending from the lower end thereof to a conical seating surface 23 near the upper end of the cap, and, which seating surface terminates upwardly in a non-screw threaded bore having the bearing surface 24 which is in axial alignment with the screw threaded socket 22. The lower, or skirt end of the cap has a conical seating surface 25.

A valve plug member is disposed within the casing 1 and consists of a bifurcated externally screw threaded shank 26 having threaded engagement with the internally screw threaded socket 22 of the closing cap member 16 and which is provided at its lower end with a head 27 having its lower end provided with a seating face 28 which co-acts with the conical seat 13 of the removable seating disc 9 when the valve is closed and the head 27 has its upper end provided with a conical seating surface 29 which co-acts with the seating surface 25 at the lower end of the closing cap when the valve is fully open, thus forming a tight joint between the head of the valve plug member and the closing cap member 16 when the valve is fully open.

A suitable cylindrical valve stem 30 is rotatably receivable in the bore 24 of the closing cap 16 and is provided at its upper end with a square section 31 which extends upwards beyond the upper face 32 of the closing cap 16 and this square section 31 terminates in an upwardly directed reduced externally screw threaded stem 33. The lower end of the valve stem 30 is provided with a cone head 34 having a seating face 35 which co-acts at all times with the interior conical seating face 23 of the closing cap 16 so that the contacting faces 23 and 35 will form a tight rotatable joint between the cone head 34 of the valve stem 30 and the interior conical seat 23 of the closing cap 16, thus working with the contacting faces 25 and 29 of the valve plug and closing cap provides a double guard and protection against any possible leakage, or escape of steam, water, ammonia, gas, or other fluids under pressure around the upper end of the valve stem, when the valve is in its open position and also when the valve is closed due to the lower contacting faces 13 and 28. It will be observed no gaskets of any kind are employed around the valve stem 30.

The valve stem 30 is provided at its lower end with a downwardly directed flat finger 30' adapted for slidable, or telescopic reception in the bifurcation of the externally screw threaded shank 26 of the valve plug member so that when the valve stem 30 is turned in one direction, the plug head 27 will be raised, or elevated to open the valve and when turned in the opposite direction lowered to cause the plug member to move downwardly for closing the valve.

As is manifest and evident from the drawings that high pressure within the valve casing 1 will insure against valve stem leakage due to the contacting faces 22 and 35, it may develop at times with low pressure, such as when the valve is used in connection with radiators, or other devices, due to the pressure being too slight to exert any upward pressure against the cone head 34 to hold the seating surface 35 thereof in positive leak tight contact with its co-acting seating surface 23 of the closing cap 16, and due to the fact that the valve stem cone head 34 can be held leak tight against its seating face 23, I shall now describe the novel adjustable handle means I employ with each valve to positively insure against leakage around the valve stem whether used in high or low pressure service.

Slidably mounted upon the square shank end 31 of the valve stem 30 is a handle plate member 36 having an upwardly extending sleeve portion 37 through which the shank 31 also extends. Fixed to the plate member 36 is a suitable annular handle 38 which provides an annular lower recess 39 around the sleeve 37 for the reception of a suitable coiled spring 40 preferably made from flattened material, and which also provides an upper annular recess 40' of greater diameter than recess 39 to receive a flat closure plate 41 mounted upon the coiled spring 40 and provided with a central opening 42 for the passage of the upper screw threaded stem section 33 of the valve stem 30 which stem is provided with a suitable nut 33' for tightening the plate against the spring to stiffen the tension of the spring when desired so as to always insure a tight contact of the seating surfaces 22 and 35, as clearly shown in Fig. 1.

It will be here observed that the coiled spring 40 is concealed entirely within the handle of the valve and is never at any time exposed to steam, water, ammonia, or gas under pressure within the valve, thus it is not subject to deterioration and, further, can be removed or replaced at any time by merely removing the nut and closure plate without taking apart any of outer parts of the valve.

In this form of self adjusting means, there is no necessity of resetting any adjustments due to any sticking of the contacting faces 23 and 35 from any cause, as the faces can be broken apart for rotation of the stem after the longest of standing by first exerting pressure downwardly upon the valve stem for breaking apart the contacting faces prior to turning the valve stem by means of the handle 38. It will be apparent that the coiled spring will also yieldingly hold the lower seating face 43 of the handle plate 36 in frictional contact with the upper seating face 32 of the closing cap 16 due to the upward pressure exerted by the coiled spring upon the closure plate 41.

It is evident that while I have shown a globe type of valve, that any other pattern may be made.

From the foregoing description, it is evident that I provide a metallic packless valve which is simple in construction, comparatively inexpensive in manufacture and highly efficient for the purposes intended.

The many advantages of the herein described invention will readily suggest themselves to those skilled in the art to which it appertains.

I do not wish to be understood as having limited myself to the specific details of construction shown and described, but desire to have it understood that the invention I have shown in the drawings is merely illustrative as it is manifest that various minor changes may be made in the exact construction and particular arrangement of parts without departing from the spirit of my invention, hence I reserve the right to make any such changes, or modifications as may fairly fall within the scope of the appended claim when fairly construed.

What I claim is:

In a packless valve, a casing having an inlet opening and an outlet opening, a casing partition having an opening disposed between the inlet and outlet openings, a recess formed in said partition adjacent the opening therein, a replaceable seating ring having a tapered seating surface disposed in said recess, a flange for said seating ring, a lock ring having screw threaded engagement with the wall of the recess and engaging the flange of said seating ring, an internally screw threaded closing cap member removably secured to the casing, an internal tapered seating surface at the lower end thereof, a valve plug having screw threaded engagement at its upper end with the closing cap member, an external tapered seating surface at the lower end of said valve plug adapted to co-act with tapered seating surface of said seating ring member, an upper external tapered seating surface for said valve plug adapted to co-act with the tapered seating surface at the lower end of said closing cap member, an internal tapered seating surface near the upper end of said closing cap member, a valve stem rotatably carried by the upper end of said closing cap member, an external tapered seating surface at the lower end of said valve stem adapted to co-act with the upper internal tapered seating surface of the closing cap member, a sliding connection between the valve stem and the valve plug, a handle having an annular groove surrounding the upper end of the valve stem and terminating upwardly in a recess, a coiled spring seated in the annular groove and extending into the recess, a metallic disc seated upon said spring and receivable in said recess, and a nut for said valve stem engaging said metallic disc.

In testimony whereof, I have hereunto affixed my signature.

JAMES A. BISHOP.